United States Patent
Jang

(10) Patent No.: US 8,050,522 B2
(45) Date of Patent: Nov. 1, 2011

(54) VIDEO PROCESSING APPARATUS AND VIDEO PROCESSING METHOD THEREOF

(75) Inventor: Beom-soon Jang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 945 days.

(21) Appl. No.: 12/023,518

(22) Filed: Jan. 31, 2008

(65) Prior Publication Data

US 2009/0041384 A1    Feb. 12, 2009

(30) Foreign Application Priority Data

Aug. 10, 2007   (KR) .................. 10-2007-0080827

(51) Int. Cl.
*G06K 9/32*    (2006.01)
*G06K 9/20*    (2006.01)
(52) U.S. Cl. ........................................ 382/298; 382/282
(58) Field of Classification Search .................. 382/298, 382/283, 282, 103, 100; 348/585, 578, 169, 348/208.6, 240.2, 240.99; 345/660, 671
See application file for complete search history.

(56) References Cited

U.S. PATENT DOCUMENTS

| | | | | |
|---|---|---|---|---|
| 6,252,632 | B1 * | 6/2001 | Cavallaro | 348/585 |
| 6,710,713 | B1 * | 3/2004 | Russo | 340/573.1 |
| 7,782,344 | B2 * | 8/2010 | Whittaker | 345/660 |
| 7,808,555 | B2 * | 10/2010 | Aratani et al. | 348/578 |
| 2004/0130567 | A1 * | 7/2004 | Ekin et al. | 345/723 |
| 2008/0060011 | A1 * | 3/2008 | Kelts | 725/39 |
| 2008/0285800 | A1 * | 11/2008 | Miyake et al. | 382/103 |

FOREIGN PATENT DOCUMENTS

KR    1998-029620 A    7/1998

* cited by examiner

*Primary Examiner* — Yon Couso
(74) *Attorney, Agent, or Firm* — Sughrue Mion, PLLC

(57) ABSTRACT

Provided are a video processing apparatus and a video processing method thereof. The video processing apparatus includes: an input unit which receives a broadcasting signal which may include zoom-in information having regional information on a part of a video image; a video processor which processes the inputted broadcasting signal; and a controller which controls the video processor to zoom in the part of the video image based on the regional information of the zoom-in information if the broadcasting signal includes the zoom-in information.

12 Claims, 5 Drawing Sheets

VIDEO PROCESSING APPARATUS AND VIDEO PROCESSING METHOD THEREOF

CROSS-REFERENCE TO RELATED APPLICATIONS

This application claims priority from Korean Patent Application No. 10-2007-0080827, filed on Aug. 10, 2007, in the Korean Intellectual Property Office, the disclosure of which is incorporated herein by reference.

BACKGROUND OF INVENTION

1. Field of Invention

Apparatuses and methods consistent with the present invention relate to a video processing apparatus and a video processing method thereof, and more particularly, to a video processing apparatus which zooms in a part of a video image, and a video processing method thereof.

2. Description of Related Art

A video processing apparatus such as a TV or a set-top box may have a zoom-in function to zoom in a part of a video image. If a small object is displayed as a video image, a viewer may not easily recognize it and may feel inconvenient. Thus, the video processing apparatus provides the zoom-in function to zoom in a part of the video image and provides convenience to a viewer.

The zoom-in function of a conventional video processing apparatus may zoom in a region selected by a user. For example, if a user selects or inputs a particular region of the image, the video processing apparatus may zoom in the concerned region at a predetermined zoom-in ratio.

However, a user should select the region of the video image individually to use the zoom-in function in the conventional video processing apparatus. Also, if a video image such as a sports scene that changes very quickly, has small objects and a lot of motion, is displayed, a user may not properly select the region to be zoomed in.

SUMMARY OF INVENTION

Accordingly, it is an aspect of the present invention to provide a video processing apparatus which can automatically zoom in a hardly-recognizable object to be identified easily, and provide a more dynamic video image, and a video processing method thereof.

Additional aspects of the present invention will be set forth in part in the description which follows and, in part, will be obvious from the description, or may be learned by practice of the present invention.

The foregoing and/or other aspects of the present invention can be achieved by providing a video processing apparatus, including: an input unit which receives a broadcasting signal which may include zoom-in information having regional information on a part of a video image; a video processor which processes the broadcasting signal; and a controller which controls the video processor to zoom in the part of the video image based on the regional information of the zoom-in information if the broadcasting signal includes the zoom-in information.

The zoom-in information may further include ratio information on a zoom-in ratio of the part of the video image, and the controller may control the video processor to zoom in the part of the video image based on the ratio information.

The zoom-in information may further include time information on a zoom-in time of the part of the video image, and the controller may control the video processor to zoom in the part of the video image based on the time information.

The video processing apparatus may further include a user input unit which receives a command from a user, and the controller may receive an input from a user through the user input unit whether to activate a zoom-in function to zoom in the part of the video image.

The video processing apparatus may further include a user input unit which receives a command from a user, and the controller may receive ratio information on a zoom-in ratio of the part of the video image through the user input unit and control the video processor to zoom in the part of the video image based on the ratio information.

The video processing apparatus may further include a user input unit which receives a command from a user, and the controller may receive time information on a zoom-in time of the part of the video image through the user input unit, and control the video processor to zoom in the pall of the video image based on the time information.

The video processing apparatus may further include a display unit which displays the video image processed by the video processor.

The foregoing and/or other aspects of the present invention can be also achieved by providing a video processing method, including: receiving a broadcasting signal which may include zoom-in information having regional information on a part of a video image; and zooming in the part of the video image based on the regional information of the zoom-in information if the broadcasting signal includes the zoom-in information.

The zoom-in information may further include ratio information on a zoom-in ratio of the part of the video image, and the zooming in the part of the video image may include zooming in the part of the video image based on the ratio information.

The zoom-in information may further include time information on a zoom-in time of the part of the video image, and the zooming in the part of the video image may include zooming in the part of the video image based on the time information.

The video processing method may further include receiving an input from a user whether to activate a zoom-in function to zoom in the part of the video image.

The video processing method may further include receiving ratio information from a user on a zoom-in ratio of the part of the video image.

The video processing method may further include receiving time information on a zoom-in time of the part of the video image from a user.

The video processing method may further include displaying the zoomed-in part of the video image.

BRIEF DESCRIPTION OF DRAWINGS

The above and/or other aspects of the present invention will become apparent and more readily appreciated from the following description of the embodiments, taken in conjunction with the accompanying drawings of which.

DETAILED DESCRIPTION OF EXEMPLARY EMBODIMENT

Hereinafter, exemplary embodiments of the present invention will be described with reference to accompanying drawings, wherein like numerals refer to like elements and repetitive descriptions will be avoided as necessary.

Figure 1:
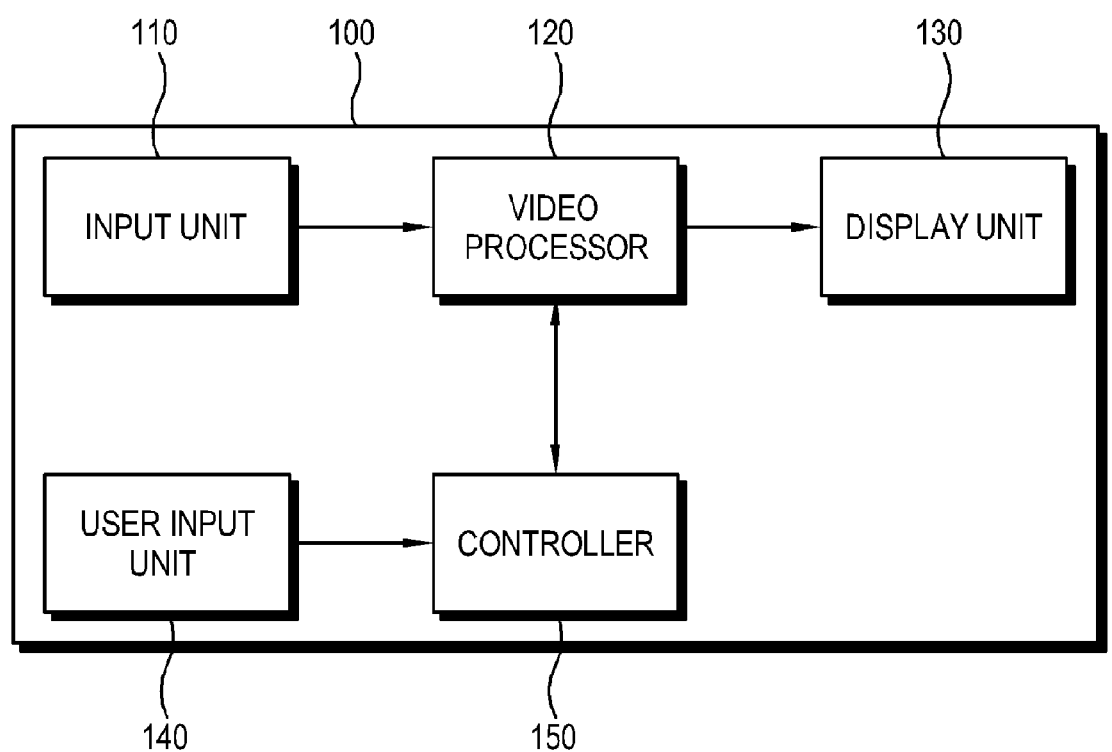
FIG. 1 is a block diagram of a video processing apparatus according to an exemplary embodiment of the present invention.

FIG. 1 is a block diagram of a video processing apparatus 100 according to an exemplary embodiment of the present invention. The video processing apparatus 100 according to the exemplary embodiment of the present invention may zoom in a part of a video image based on zoom-in information included in a broadcasting signal. For example, the video processing apparatus 100 may include a TV, a set-top box, etc.

As shown in FIG. 1, the video processing apparatus 100 may include an input unit 110, a video processor 120, a display unit 130, a user input unit 140 and a controller 150.

The input unit 110 receives a broadcasting signal which may include zoom-in information having region information on a part of a video image. The input unit 110 may receive the broadcasting signal from a broadcasting station through an antenna or a cable. The input unit 110 may include a tuner to tune one of a plurality of broadcasting channels.

The broadcasting signal may include a video signal and zoom-in information on a broadcasting program. For example, a digital video stream may include additional information on broadcasting language and sound. The zoom-in information belongs to the additional information and may be included in the video stream for transmission.

The zoom-in information is generated by the broadcasting station, and included in the broadcasting signal to be transmitted to the video processing apparatus 100. For example, the broadcasting station may add the zoom-in information on a selected region of a video image that changes quickly, has a small object and a lot of motions, such as a sports scene, to the broadcasting signal for transmission. The zoom-in information is real-time additional information and is properly synchronized with the video signal for transmission. The video processing apparatus 100 may process the video signal included in the received broadcasting signal to play the video image, and process the zoom-in information of the concerned video image to zoom in a part of the video image.

The zoom-in information is provided to zoom in the part of the video image which is being displayed, and includes regional information on the part of the concerned video image. For example, the regional information may include a coordinate value of the region to be zoomed in from an image frame. Further, the regional information may include the size and shape of the region to be zoomed in.

The zoom-in information may further include ratio information on the ratio of zooming in the part of the video image, and time information on the time of zooming in the part of the video image. The ratio information includes a predetermined zoom-in ratio of the part of the video image. The time information includes predetermined zoom-in time of the part of the video image.

The video processor 120 processes the broadcasting signal inputted to the input unit 110. The video processor 120 may process the video signal included in the broadcasting signal to play the video image, and process the zoom-in information to zoom in the part of the video image.

The display unit 130 displays the video image processed by the video processor 110. The display unit 130 may include a cathode ray tube (CRT), a liquid crystal display (LCD), a plasma display panel (PDP), etc.

The user input unit 140 receives a command from a user. For example, the user input unit 140 may include a shortcut key provided in a remote controller or a TV to select an automatic zoom-in function. The user input unit 140 transmits the user's input to the controller 150, and executes the user's command on whether to use the zoom-in function.

If the broadcasting signal includes the zoom-in information, the controller 150 controls the video processor 120 to zoom in the part of the video image based on the regional information of the zoom-in information. The controller 150 determines whether the broadcasting signal includes the zoom-in information. If the broadcasting signal includes the zoom-in information, the controller 150 controls the video processor 120 to zoom in the part of the video image corresponding to the coordinate value according to the regional information included in the zoom-in information.

Figure 2A:
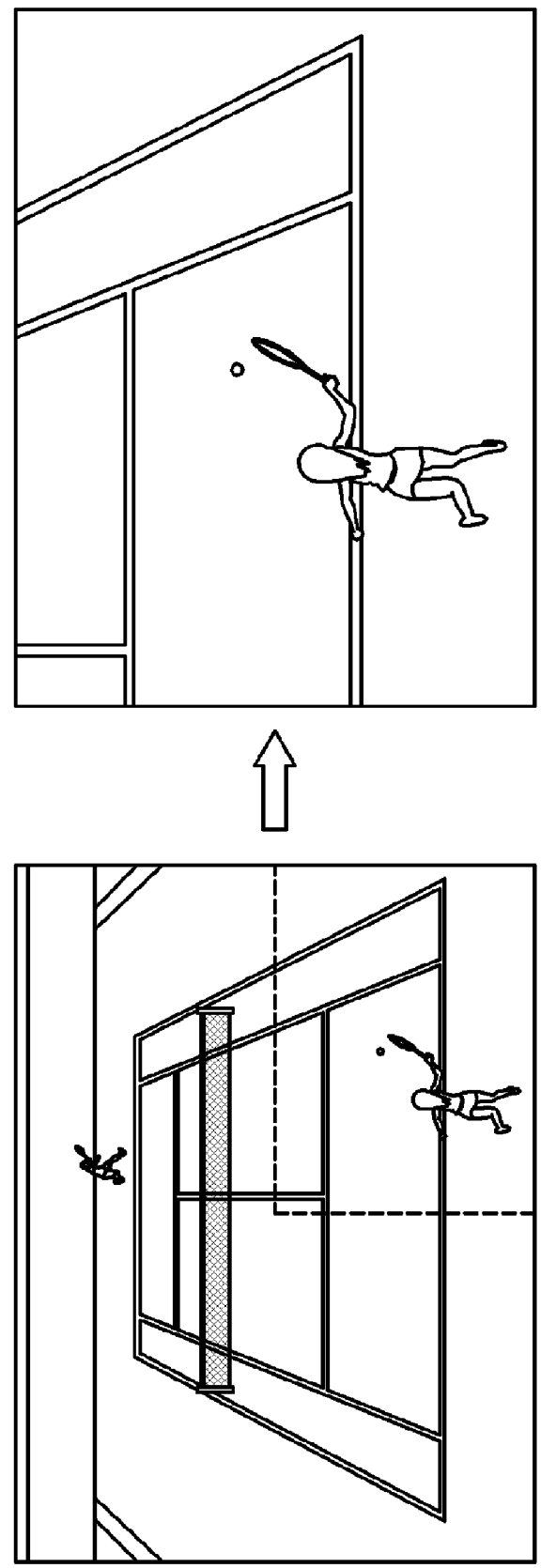
FIGS. 2A and 2B illustrate zoomed-in video images of the video processing apparatus according to the exemplary embodiment of the present invention.
Figure 2B:
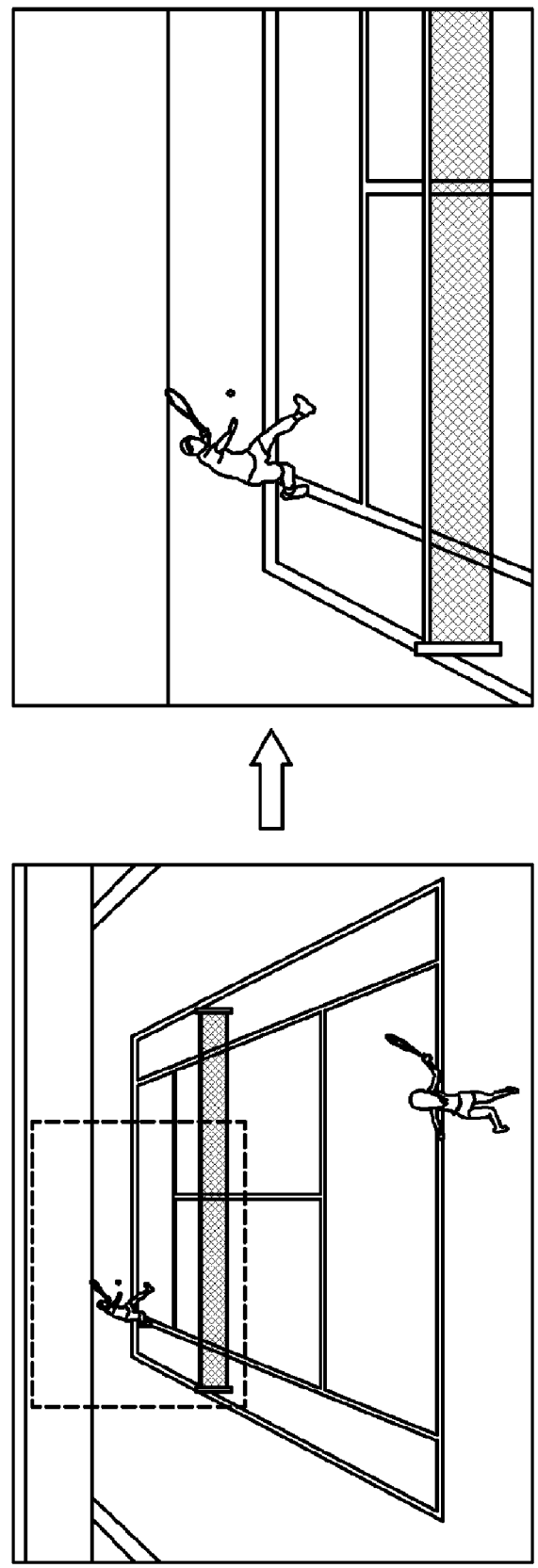

As shown in FIGS. 2A and 2B, the video processing apparatus 100 may zoom in a region displaying a player or a ball while a sports match is being broadcast and may provide a more dynamic video image so that a user can easily recognize the movement of the player or the ball.

The controller 150 may control the video processor 120 to zoom in the part of the video image based on the ratio information and the time information of the zoom-in information. The controller 150 may receive the ratio information and the time information from a user through the user input unit 140. For example, if the zoom-in information includes ratio information of 2:1 zoom-in ratio and time information of three seconds, the image processing apparatus 100 zooms in a concerned region at the 2:1 zoom-in ratio and displays it for three seconds. If the zoom-in information does not include the ratio information and the time information, the controller 150 may control the video processor 120 to zoom in the part of the video image according to the ratio information and the time information preset by a user.

The controller 150 may receive an input from a user through the user input unit 140 whether to activate the zoom-in function to zoom in a part of a video image. That is, if the automatic zoom-in function is inputted through the user input unit 140, the controller 150 may control the video processor 120 to zoom in the part of the video image based on the zoom-in information. The controller 150 may pre-store the ratio information and the time information inputted by a user through the user input unit 140.

Figure 3:
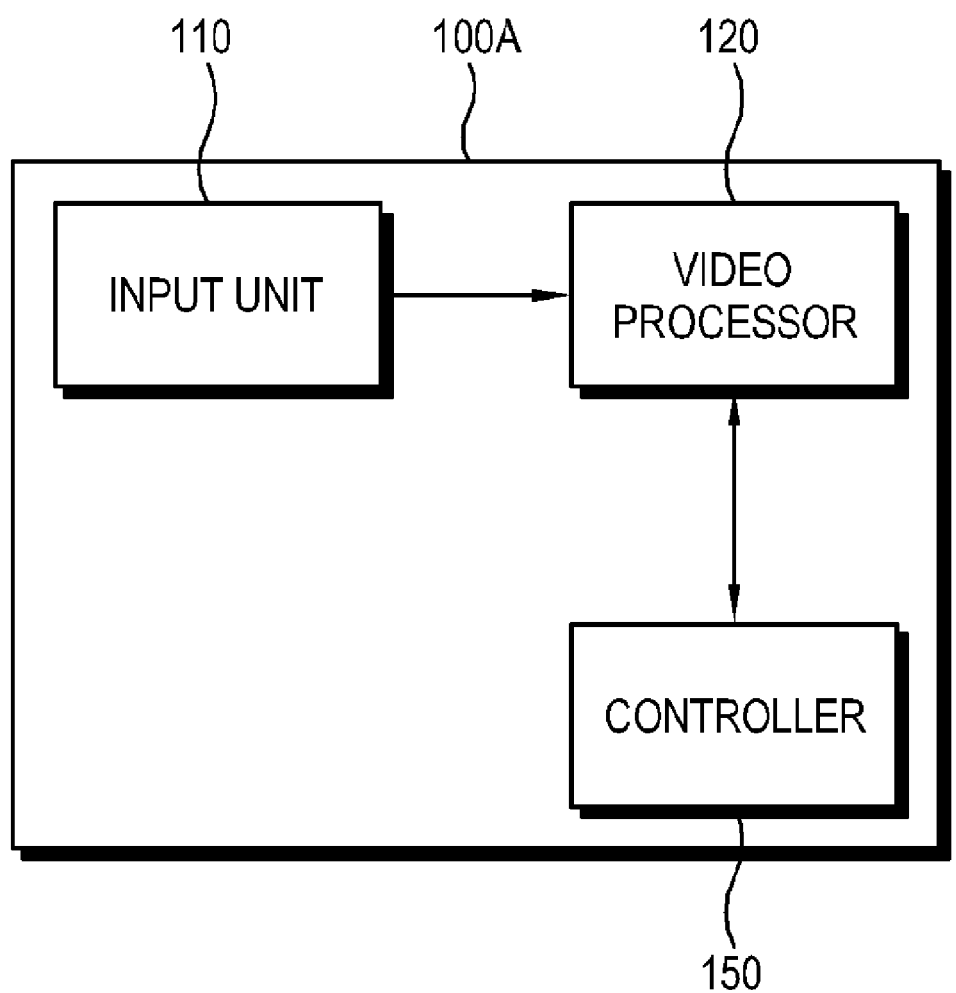
FIG. 3 is a block diagram of a video processing apparatus according to another exemplary embodiment of the present invention.

FIG. 3 is a block diagram of a video processing apparatus 100a according to another exemplary embodiment of the present invention. As shown therein, the video processing apparatus 100a may include an input unit 110, a video processor 120 and a controller 150. Like elements are identical or similar to those of the video processing apparatus 100, and detailed description thereof will be omitted.

Figure 4:
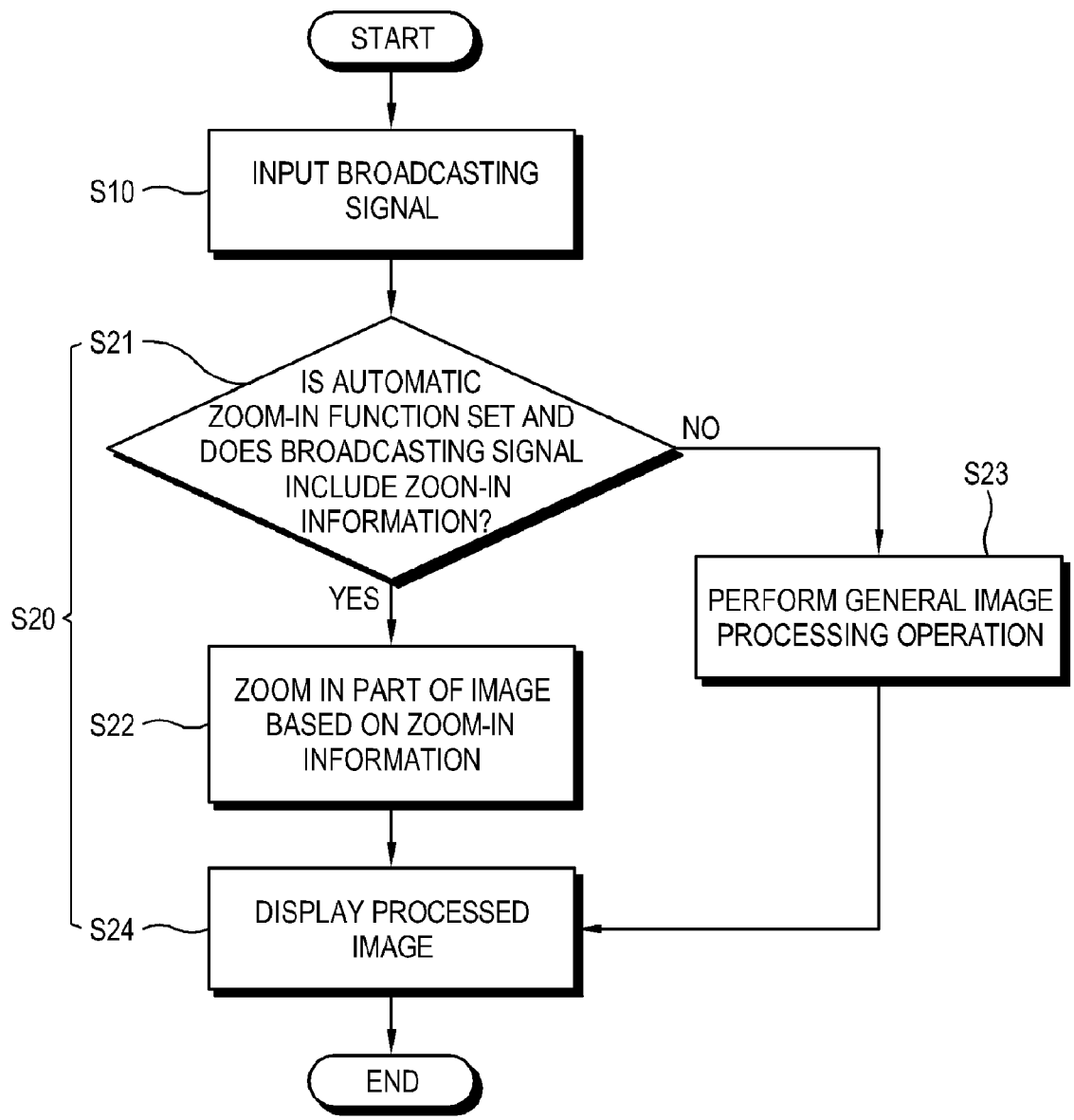
FIG. 4 is a flowchart to describe an operation of the video processing apparatus according to the exemplary embodiment of the present invention.

Hereinafter, a video processing method according to an exemplary embodiment of the present invention will be described with reference to FIG. 4.

The video processing apparatus 100 receives a broadcasting signal which may include zoom-in information having regional information on a part of a video image (S10). If the broadcasting signal includes the zoom-in information, the video processing apparatus 100 zooms in the part of the video image based on the regional information of the zoom-in information (S20).

More specifically, the operation S20 may include operations S21, S22, S23 and S24.

First, the video processing apparatus 100 determines whether an automatic zoom-in function is set and whether the inputted broadcasting signal includes the zoom-in information (S21). For example, the video processing apparatus 100 receives a user's input through the user input unit 140, transmits the input to the controller 150, and presets whether to use the automatic zoom-in function.

If it is determined at operation S21 that the automatic zoom-in function is set and the broadcasting signal includes the zoom-in information, the video processing apparatus 100 zooms in the part of the video image based on the zoom-in information (S22). As shown in FIGS. 2A and 2B, the video processing apparatus 100 may zoom in the region displaying a player or a ball, and may provide a more dynamic video image while a sports match is being broadcast. Thus a user can easily recognize the movement of the player or the ball.

If it is determined at operation S21 that the automatic zoom-in function is not set or the broadcasting signal does not include the zoom-in information, the video processing apparatus 100 performs a general video processing operation instead of using the automatic zoom-in function (S23).

Then, the video processing apparatus 100 displays the video image processed at operation S22 or S23.

The video processing apparatus 100 according to the present invention may process the video image of a sports match, but not limited thereto. Alternatively, the present invention may be applicable to all kinds of broadcasting programs.

As described above, the present invention provides a video image processing apparatus which can automatically zoom in a hardly-recognizable object to be identified easily, and provide a more dynamic video image while a broadcasting program is being broadcast.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A video processing apparatus, comprising:
   an input unit which receives a broadcasting signal that includes zoom-in information having regional information and ratio information on a part of a video image;
   a video processor which processes the received broadcasting signal; and
   a controller which controls the video processor to zoom in the part of the video image based on the regional information and the ratio information of the zoom-in information;
   wherein, the regional information is about a region to be zoomed in, and, the ratio information is about a predetermined zoom-in ratio of the part of the video image.

2. The video processing apparatus according to claim 1, wherein the zoom-in information further comprises time information on a zoom-in time of the part of the video image, and
   the controller controls the video processor to zoom in the part of the video image further based on the time information.

3. The video processing apparatus according to claim 1, further comprising a user input unit which receives a command from a user, wherein,
   the controller receives an input from the user through the user input unit to activate a zoom-in function to zoom in the part of the video image.

4. The video processing apparatus according to claim 1, further comprising a user input unit which receives a command from a user, wherein
   the controller receives the ratio information on the zoom-in ratio of the part of the video image through the user input unit and controls the video processor to zoom in the part of the video image further based on the ratio information.

5. The video processing apparatus according to claim 1, further comprising a user input unit which receives a command from a user, wherein,
   the controller receives time information on a zoom-in time of the part of the video image through the user input unit, and controls the video processor to zoom in the part of the video image further based on the time information.

6. The video processing apparatus according to claim 1, further comprising a display unit which displays the video image processed by the video processor.

7. A video processing method, comprising:
   using a processor which performs the method comprising the steps of:
   receiving a broadcasting signal that includes zoom-in information having regional information and ratio information on a part of a video image; and
   zooming in the part of the video image based on the regional information and the ratio information of the zoom-in information;
   wherein, the regional information is about a region to be zoomed in, and, the ratio information is about a predetermined zoom-in ratio of the part of the video image.

8. The video processing method according to claim 7, wherein the zoom-in information further comprises time information on a zoom-in time of the part of the video image, and
   the zooming in the part of the video image comprises zooming in the part of the video image further based on the time information.

9. The video processing method according to claim 7, further comprising receiving an input from a user whether to activate a zoom-in function to zoom in the part of the video image.

10. The video processing method according to claim 7, further comprising receiving the ratio information from a user on the zoom-in ratio of the part of the video image.

11. The video processing method according to claim 7, further comprising receiving time information from a user on a zoom-in time of the part of the video image.

12. The video processing method according to claim 7, further comprising displaying the zoomed-in part of the video image.

* * * * *